US009246643B2

(12) United States Patent
Braun et al.

(10) Patent No.: US 9,246,643 B2
(45) Date of Patent: Jan. 26, 2016

(54) METHOD OF DETERMINING AN ERROR RATE AND A SUITABLE TESTING DEVICE

(75) Inventors: Thomas Braun, Munich (DE); Uwe Baeder, Ottobrunn (DE); Pirmin Seebacher, Rosenheim (DE)

(73) Assignee: Rohde & Schwarz GmbH & Co. KG, München (DE)

( * ) Notice: Subject to any disclaimer, the term of this patent is extended or adjusted under 35 U.S.C. 154(b) by 1971 days.

(21) Appl. No.: 11/908,594

(22) PCT Filed: Mar. 15, 2006

(86) PCT No.: PCT/EP2006/002368

§ 371 (c)(1), (2), (4) Date: Dec. 6, 2007

(87) PCT Pub. No.: WO2006/099980

PCT Pub. Date: Sep. 28, 2006

(65) Prior Publication Data

US 2008/0214183 A1 Sep. 4, 2008

(30) Foreign Application Priority Data

Mar. 21, 2005 (DE) ........................ 10 2005 012 978
Apr. 11, 2005 (DE) ........................ 10 2005 016 585

(51) Int. Cl.
*H04W 24/00* (2009.01)
*H04L 1/20* (2006.01)
(Continued)

(52) U.S. Cl.
CPC .............. *H04L 1/20* (2013.01); *H04B 17/0085* (2013.01); *H04B 17/24* (2015.01); *H04L 1/0083* (2013.01); *H04L 1/1671* (2013.01); *H04L 1/24* (2013.01); *H04L 1/0003* (2013.01); *H04L 1/1819* (2013.01)

(58) Field of Classification Search
CPC .................................................... H04W 24/00
See application file for complete search history.

(56) References Cited

U.S. PATENT DOCUMENTS 5,910,977 A 6/1999 Torregrossa
6,434,165 B1 * 8/2002 Sherer et al. ................. 370/465

(Continued)

FOREIGN PATENT DOCUMENTS

DE 100 65 937 5/2002
DE 103 15 057 10/2004

(Continued)

OTHER PUBLICATIONS

International Search Report in PCT/EP2006/002368 mailed Jul. 13, 2006.

(Continued)

*Primary Examiner* — Justin Lee

(74) *Attorney, Agent, or Firm* — Marshall, Gerstein & Borun LLP

(57) ABSTRACT

The invention relates to a method and to a test device (12) which is used to determine an error rate during the transfer of data (1) in a mobile radio system. Said mobile radio system comprises at least one transfer channel, wherein several data partial flows (2.1, 2.2, 2.6) are transferred. The several data partial flows (2.1, 2.2 . . . 2.6) are produced in a signal generator unit (8). A transport format is determined, in an individual manner, for each data partial flow (2.1, 2.2 . . . 2.6). The data partial flows (2.1, 2.2 . . . 2.6) are sent, respectively, to a number of transfer blocks which belong together (5.1, . . . 7.1). A device which is to be tested captures the transfer blocks (5.1, . . . 7.1) of the data partial flows (2.1, 2.2 . . . 2.6) and evaluates them. According to the accuracy of the evaluation, a positive or negative actuation signal (ACK, NACK) is sent back by the device which is to be tested. An error rate of each data partial flow (2.1, 2.2 . . . 2.6) is determined by the test device (12) from the actuation signals (ACK, NACK) which are captured by the test device (12).

12 Claims, 3 Drawing Sheets

14 12 13 18 8 1 2.1 2.2 2.3 2.4 2.5 2.6 3.1 3.2 3.3 3.4 3.5 3.6 14.1 14.2 15 DL UL 16 17 17.3 17.2 17.1

(51) Int. Cl.

| | |
|---|---|
| ***H04L 1/16*** | (2006.01) |
| ***H04L 1/24*** | (2006.01) |
| ***H04B 17/00*** | (2015.01) |
| ***H04B 17/24*** | (2015.01) |
| *H04L 1/00* | (2006.01) |
| *H04L 1/18* | (2006.01) |

(56) References Cited

U.S. PATENT DOCUMENTS

2001/0052091 A1 12/2001 Goldsack et al.
2003/0081692 A1* 5/2003 Kwan et al. .................. 375/295
2003/0224836 A1 12/2003 Tsai et al.
2005/0022089 A1* 1/2005 Le et al. ....................... 714/749
2005/0254463 A1* 11/2005 Suzuki et al. ................ 370/335
2006/0268882 A1* 11/2006 Mademann .................. 370/394
2007/0081492 A1* 4/2007 Petrovic et al. .............. 370/331

FOREIGN PATENT DOCUMENTS

DE 103 25 288 12/2004
EP 1 130 834 9/2001
WO WO-02/089390 11/2002
WO WO-03/001681 1/2003
WO WO-2005/034539 4/2005

OTHER PUBLICATIONS

International Preliminary Report on Patentability and Written Opinion in PCT/EP2006/002368 mailed May 30, 2007.

* cited by examiner

METHOD OF DETERMINING AN ERROR RATE AND A SUITABLE TESTING DEVICE

BACKGROUND OF INVENTION

1. Field of Invention

The invention relates to a method of determining an error rate during a data transfer in a mobile radio system and also to a testing device.

2. Related Technology

In a third-generation mobile radio system, data are transferred in packets. For this purpose, the physical transfer channel is divided into consecutive signal frames that have in turn time slots as subdivisions. Each of said time slots subdivides a signal frame into a specified number of transfer blocks. In this connection, a plurality of mutually corresponding transfer blocks in consecutive signal frames is used in each case for the transfer of a data subflow. Every transfer block of a signal frame therefore transfers a portion of the total data transferred. Consequently, a plurality of data subflows is transferred in so-called concurrent processes between the base station and the mobile radio devices communicating with it.

In order to determine whether the transfer of an individual transfer block was error-free, a confirmation signal is sent back by the subscriber receiving the transfer block. The confirmation signal is a positive confirmation signal for the case of correct reception or a negative confirmation signal for the case of an incorrect reception, respectively. To test devices in the mobile radio system, said confirmation signals are recorded and an error rate is determined from the ratio of the negative confirmation signals to the total number of confirmation signals. In the case of the known procedure of the method as it is described in the 3GPP standard, a fixed transport format is used for this purpose in which all the data subflows are therefore transmitted with a common set of parameters. This has the disadvantage that it is necessary to wait a complete run of this test loop to determine an error rate that occurs in the case of a different transport format. In addition, the test method is static since the mobile radio device addressed in consecutive transfer blocks has in each case to receive and decipher a transmitted signal transmitted with the same parameters. Consequently, additional errors that occur in a dynamic process, that is to say with varying transport formats, are not detected.

The invention provides a method as well as a testing device that make possible the simultaneous determination of error rates for different transport formats.

The invention provides a method of determining an error rate during a data transfer in a mobile radio system having at least one transfer channel in which a plurality of data subflows is transmitted, comprising the following method steps: generating the plurality of data subflows by a signal generator unit, specifying transport formats individually for each data subflow, transmitting the data subflows in a number of associated transfer blocks in each case to a device to be tested by a testing device, receiving and evaluating the transfer blocks by the device to be tested and sending back a positive or negative confirmation signal for every transfer block, and determining at least one error rate from the received confirmation signals of all the data subflows by the testing device. The invention also provides a testing device for determining an error rate during the transfer of data in a mobile radio system, wherein the testing device comprises a signal generator unit for generating a plurality of data subflows, a configuration block for specifying transport formats individually for every data subflow, a transceiver for transmitting the data subflows in a number of associated transfer blocks in each case and for receiving a positive or negative confirmation signal, and an evaluating unit for determining an error rate from the received confirmation signals.

In the case of the method according to the invention, the testing device first generates a plurality of data subflows by means of a signal generator unit. A set of transmission parameters is then specified individually for each of these data subflows by a configuration unit. In this connection, each set of transmission parameters defines a particular transport format with which the respective data subflow is transmitted. The data subflow is transmitted in each case in a number of associated transfer blocks by a transceiver unit in the testing device. The device to be tested receives the transfer blocks and evaluates them. During the evaluation the data transferred in the transfer blocks are checked for correct transfer and, accordingly, a positive confirmation signal is sent back in the case of correct transfer or, respectively, a negative confirmation signal in the case of incorrect transfer. The testing device receives the confirmation signals sent back by the device to be tested and determines therefrom an error rate for the device to be tested.

In the case of the method according to the invention, it is advantageous that the device to be tested is additionally loaded in that the transport format may vary from one transport block to the next transport block. On the one hand, this increases the loading on the mobile radio device so that a realistic value for an error rate is determined even in the case of a combined evaluation of all the confirmation signals over all the data subflows, and on the other hand, it is possible to determine an individual error rate for every data subflow that is transmitted with a particular transport format, that is to say with a specified set of parameters.

The following description describes various preferred embodiments of the method according to the invention as well of the testing device according to the invention.

In particular, it is advantageous to determine an error rate individually for every data subflow by means of separate evaluating blocks in an evaluating unit. In this connection, the individual error rate gives an indication of whether, for example, an accumulation of detection errors can be correlated systematically, for example, with a chosen type of modulation.

Furthermore, it is advantageous to specify for each of the data subflows the maximum number of repetitions of the transfer block that are re-transmitted after a negative confirmation signal is sent back before the transfer block is discarded. Consequently, a redundancy version sequence can be separately specified for every data subflow. That makes it possible to eliminate effects that result from the repeated transmission of the same data content.

It is a further advantage to specify by means of a configuration block which transfer blocks are how often repeatedly transferred, in which connection, just like the redundancy version used, said repetition is specified independently of a confirmation signal.

BRIEF DESCRIPTION OF THE DRAWINGS

A preferred exemplary embodiment of the method according to the invention and also of the testing device are shown in the drawing and are explained in greater detail in the subsequent description. In the drawing.

DETAILED DESCRIPTION

Figure 1:
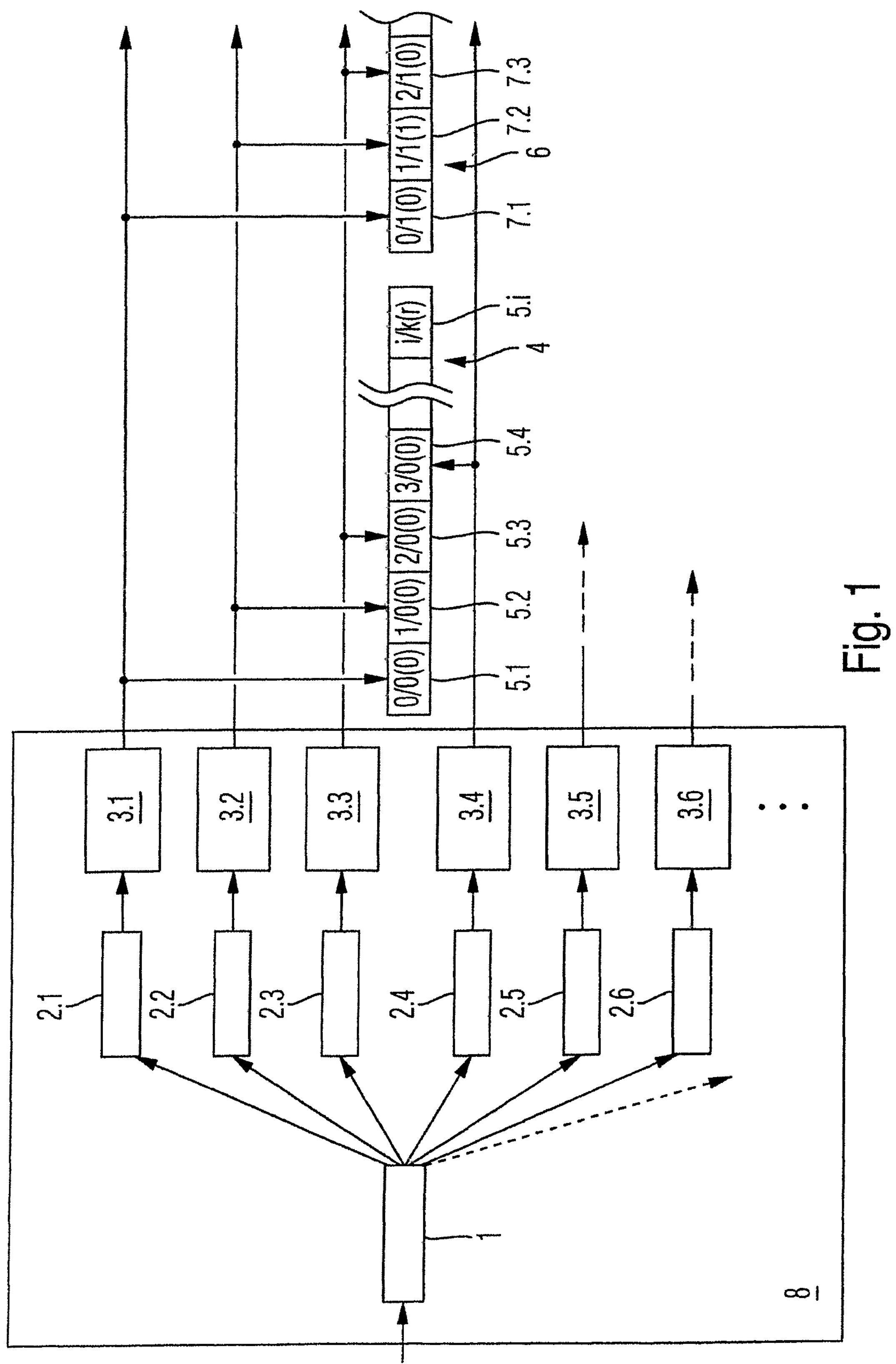
FIG. 1 shows a diagrammatic representation of the transfer of data in a mobile radio system.

FIG. 1 shows a very simplified diagram of how data are transferred in packets in a third-generation mobile system. A data flow 1 to be transferred is first broken down into data subflows 2.1 to 2.6. As indicated by the broken arrow in FIG. 1, even more than the 6 data subflows shown may be used, depending on the method chosen. The six data subflows 2.1 to 2.6 thus produced are processed independently of one another by coding and modulation blocks 3.1 to 3.6 and transmitted by a suitable transmission unit. The transmission signal itself comprises consecutively transmitted signal frames 4, 6. Said signal frames 4, 6 have a predetermined temporal length, each signal frame 4, 6 being subdivided into individual transmission blocks 5.1, 5.2 to 5.i or 7.1, 7.2, 7.3, . . . in accordance with a timing pattern. The individual signal frames 4, 6 have a corresponding number of transfer blocks 5.1 to 5.1', 7.1 to 7.1'.

In this connection, in the individual signal frames 4, 6, particular transfer blocks are occupied by the signal to be transferred of a particular process. The transfer blocks of a process have minimum temporal spacing. FIG. 1 shows that suitably arranged transfer blocks, for example, belong in each case to a process. Thus, a part of the data subflow 2.1 is transferred in the respective first transfer blocks 5.1 and 7.1. In the same way, the respective second transfer blocks 5.1 and 7.2 belong together, a part of the data of the data subflow 2.2 is in each case transferred in said second transfer block.

In this way, the individual processes extend over a plurality of consecutive signal frames 4, 6 and in each case lay claim in doing so to only a particular time slot within the signal frame 4, 6. A plurality of so-called concurrent processes results. The generation of the plurality of data subflows 2.1 to 2.6 and also the processing by the coding and modulation blocks 3.1 to 3.6 takes place in a signal generator unit 8 of the testing device according to the invention. In this connection, the individual signal generators 3.1 to 3.6 for processing the data subflows 2.1 to 2.6 may use different transport formats. A transport format brings together all the parameters necessary for the transfer of data. The type of modulation, the data rate, the power, etc., for example, can be determined in this way.

Individual sets of parameters can therefore be used in each case for concurrent processes by the use of individual coding and modulation blocks 3.1 to 3.6. Correspondingly, the device to be tested to which the signal frames 4, 6 are transferred must be adjusted to the modified set of parameters between the individual transfer blocks 5.1, 5.1, 5.3, etc. and, for example, use a different method of demodulation.

FIG. 2 again shows a simplified diagram of such a transfer method for determining the error rate. Such a transfer method is also known as HSDPA (High Speed Downlink Packet Access). The HSDPA transfer method shown in FIG. 2 comprises an item of control information and a data flow in the downlink DL and an item of control information in the uplink UL. However, the method is not tied to this transfer direction and can equally well be used in a High Speed Uplink Packet Access (HSUPA).

As has already been described, a first transfer block 5.1 is first transmitted in a signal frame 4. Said transfer block is designated by the identifier $0/0_{(0)}$ in FIG. 2. In this connection, the first digit denotes the number of the respective transfer block in the signal frame 4. The second place characterizes the signal frame itself and the third place specifies how many repetitions of a transfer of the same transfer block have taken place.

After the first transfer block 5.1 has been transmitted to the device to be tested, the device to be tested has a time interval 10 available to evaluate the received signal. The time interval 10 has a minimum length in which the signal received is demodulated and checked for correct transfer. A so-called CRC sum (Cyclic Redundancy Check), for example, can be used to confirm correct transfer. The result of said test is transmitted back by the device to be tested to the testing device. For this purpose, the device to be tested transmits an "ACK" or "NACK" signal as positive or as negative confirmation signal. In the case of normal data transfer, a transfer block with new data is transmitted or a particular transmission block is retransmitted depending on a positive or negative confirmation signal ACK or NACK, respectively, that is transmitted from a mobile radio device, for example, to the base station. Such a repeat transmission of a transfer block takes place until a particular number of repetitions has occurred. A repetition takes place every time a negative confirmation signal "NACK" relating to a particular transfer block has been received by the base station. The maximum number of such transfer repeats is specified for the transfer of a particular data flow 1. In the case of the method according to the invention, the number of repeats is specified individually for the transfer blocks associated with a particular process so that different processes may have different maximum numbers of repeats.

Whether the data to be repeatedly transferred are transferred in the same form again or, alternatively, in a modified form can likewise be specified. For this purpose, a sequence of redundancy versions is specified by the base station so that how many times and in what redundancy version data are transferred again in transfer blocks is already unambiguously defined at the start of the process. In the method according to the invention, this takes place in turn for the individual processes independently of one another.

Figure 2:
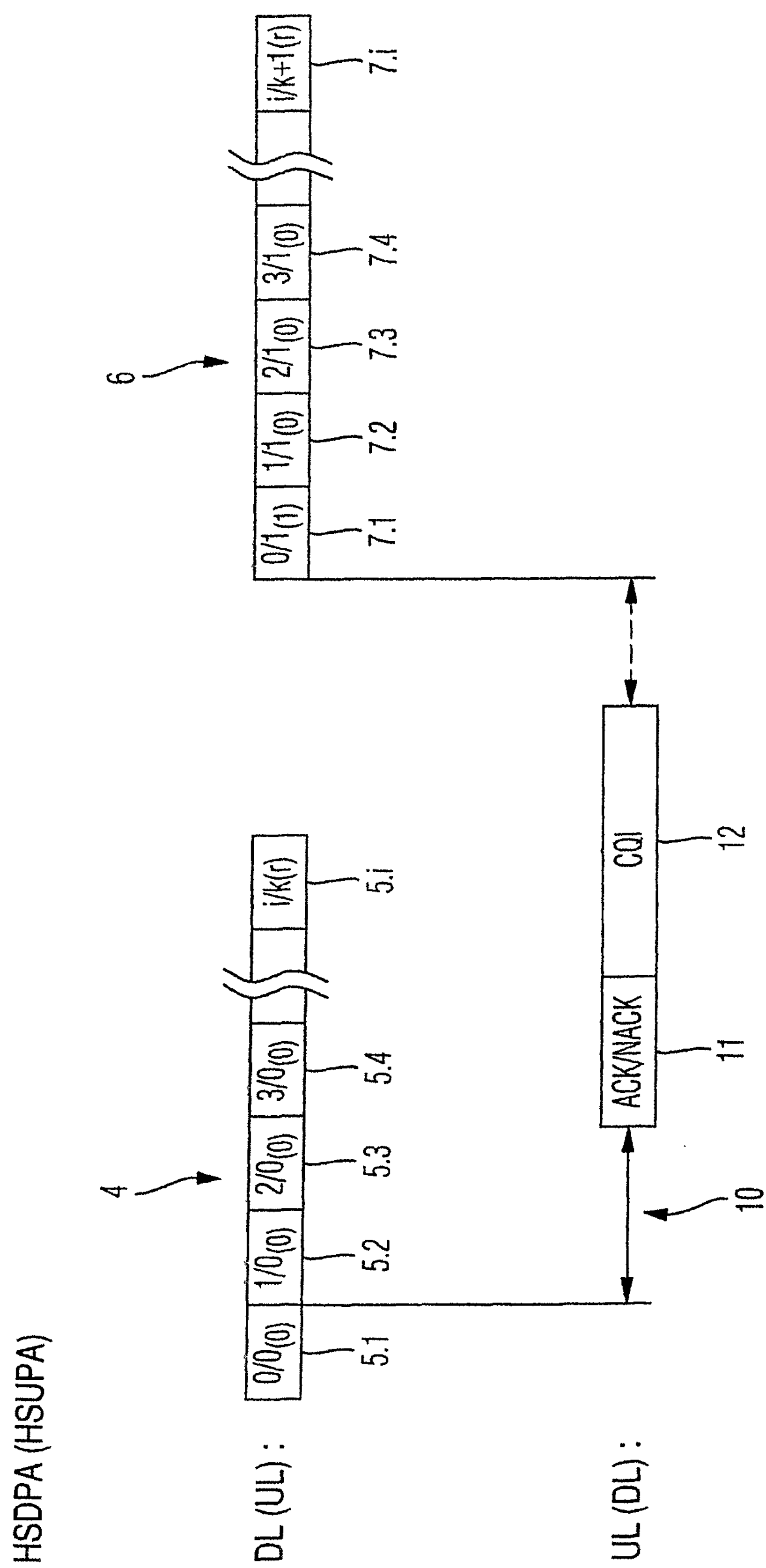
FIG. 2 shows a diagrammatic representation of a transfer channel of a mobile radio system.

In the exemplary embodiment shown in FIG. 2, it can be seen that the first transfer block 7.1 of the second signal frame 6 is a repeat transfer of the data of the first transfer block 5.1 of the first signal frame 4. To be able to perform the test method without the actual detection precision of the device being affected, such a repetition of a transfer block can take place, for example, even if the original transmission of the transmission block 5.1 and the subsequent evaluation have led to a correct result and the mobile radio device to be tested has therefore sent back an "ACK" signal. This makes it possible, for example, in conjunction with the respective redundancy versions used to determine whether particular redundancy versions have a differing error rate.

As has already been described, a CRC checksum is added as a test criterion to the transfer block transferred from the transmitter to detect a correct transfer of a transfer block. In order to enforce the processing of a sequence of redundancy versions even in the case of good-quality transfer, the base station can deliberately add a test criterion that is not appropriate to the data of the transfer block. In this way, the return transmission of one or more "NACKs" is enforced in the case of the device 12 to be tested. In addition to the deliberate execution of a sequence of redundancy versions, whether positive and negative, respectively, confirmation signals "ACKs" or "NACKs" are actually being correctly assigned by the device to be tested is also checked.

In addition to the positive or negative confirmation signal ACK or NACK, respectively, a channel quality indicator (CQI; Channel Quality Indicator) is also transmitted to the testing device by the device to be tested. The CQI is an index in a list of transport formats. The list is arranged in such a way that a higher CQI corresponds to a lower energy per transferred data bit for the same channel. Using the CQI, the device to be tested specifies which transport format it can receive with a specified block error rate, given the current channel quality. Accordingly, in the case of a higher CQI than the CQI transmitted by the device to be tested, the block error rate should be higher than the specified block error rate and in the case of a lower CQI it should be lower.

To determine the error rate of a device to be tested, the error rates must be determined, depending on the distribution of the CQIs, if transport formats are used that deviate from a mean CQI of the device to be test in a particular way. That is to say, the distribution of the CQIs for a particular transport format is first determined. A mean CQI is determined for said distribution. Proceeding from said mean CQI, the error rates are determined for a transport format corresponding to a particular lower CQI and also to a particular higher CQI. Since different transport formats can be selected for different processes in the case of the method according to the invention, said determination of the error rates in the case of lower CQIs and higher CQIs, respectively, can be performed in parallel by suitable configuration of the concurrent processes.

The HSDPA transfer channel shown can also be operated at the same time as a reference measuring channel. Said reference measuring channel is operated in uplink and downlink in addition to the channel HSDPA. This makes it possible to perform a test loop on the reference measuring channel at the same time as the method described for determining the error rate in the transfer channel HSDPA. In this way, it is possible to determine not only a bit error rate as well as a block error rate simultaneously, but also the data throughput for the HSPDA transfer. In this way, the effect of the HSDPA transfer on non-HSPDA transfer channels can be measured. In third-generation mobile radio systems, for example, non-HSPDA channels are used to measure the sensitivity of the receiver.

Figure 3:
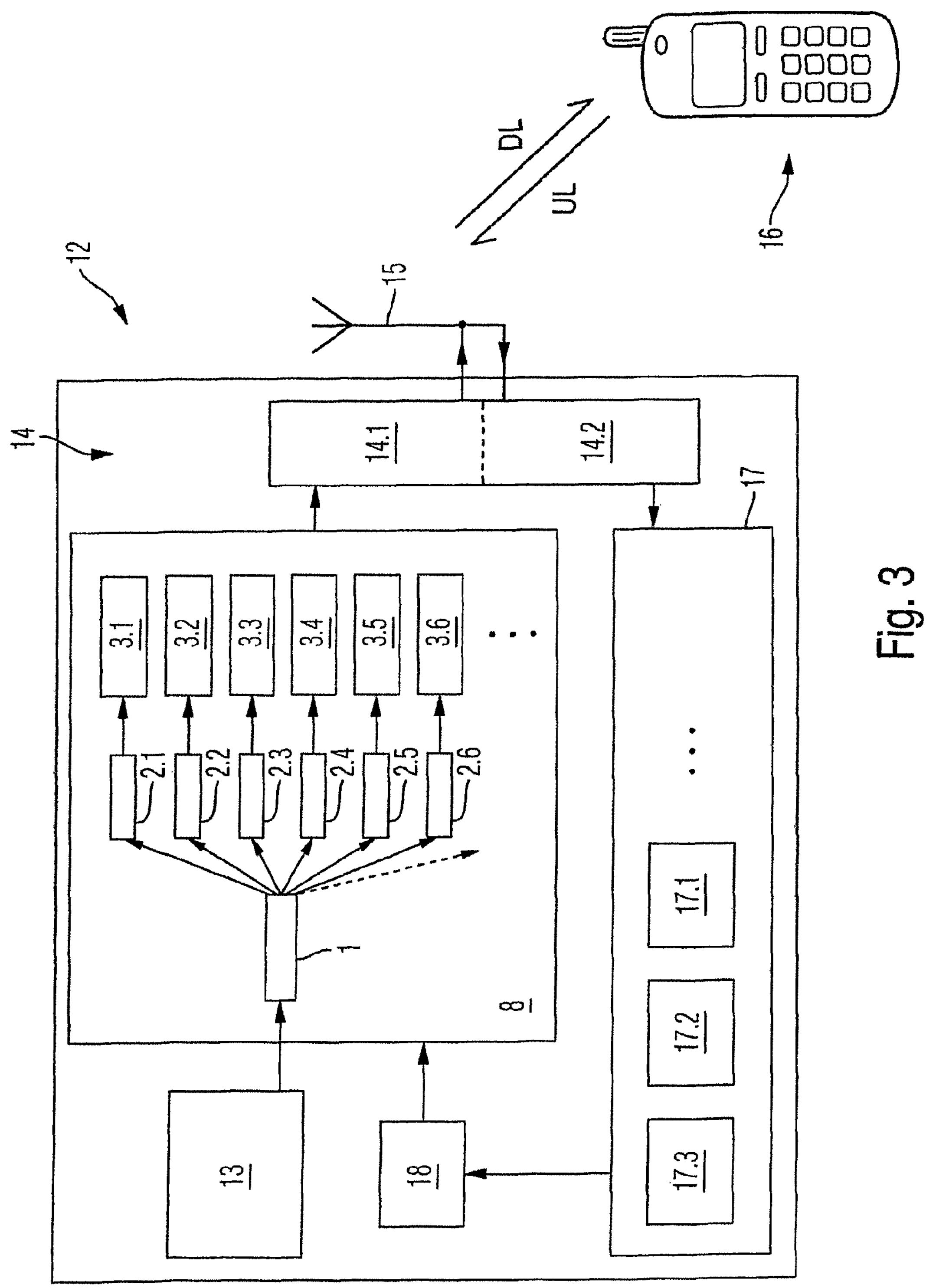
FIG. 3 shows a block circuit diagram of the testing device according to the invention.

FIG. 3 shows a testing device 12 according to the invention as a block circuit diagram. The testing device 12 has a data source 13 that first generates a data flow. Said data flow is conveyed to a signal generator unit 8 that breaks down the data flow 1 into a plurality of data subflows 2.1 to 2.6 in a way already described. The data subflows 2.1 to 2.6 are processed by coding and modulation blocks and conveyed in a particular transport format to a transceiver unit 14. Said transceiver unit 14 comprises a transmitter 14.1 and a receiver 14.2. The transceiver unit 14 is connected to an antenna 15 and transmits the data subflows 2.1, . . . 2.6 in the manner explained in regard to FIG. 2 to a device to be tested, a mobile radio device 16 in the exemplary embodiment shown.

FIG. 3 shows the transfer of data by means of radio. However, it is also possible to use a cable-bound connection between the mobile radio device 16 and the testing device 12 in order either to be able to check different attenuation factors systematically or, alternatively, to eliminate interference effects, for example, on the radio link.

Just like the CQI, the positive or negative confirmation signals "ACK" or "NACK", respectively, sent back by the mobile radio device 16 are received by the receiver 14.2 at the testing device end. The positive or negative confirmation signals are then conveyed to an evaluating unit 17. In FIG. 3, the evaluating unit 17 comprises the evaluating blocks 17.1, 17.2 and 17.3 or more, each of which is assigned to a particular transfer block 5.i, 7.i of a respective signal frame 4, 6. Thus, the evaluating block 17.1, for example, may in each case evaluate the respective negative or positive confirmation signals relating to the first transfer blacks 5.1, 7.1 etc. and consequently make it possible to draw a conclusion about the error rate of the first process or of the first data subflow 2.1, respectively. Correspondingly, the second evaluating block 17.2 is allocated to the second transfer blocks 5.2, 7.2, etc. The second evaluating block 17.2 consequently determines an error rate for the second data subflow 2.2. Correspondingly, a separate evaluating block 7.3, . . . is provided for the respective further data subflows 2.3 to 2.6.

In order to specify the respective transport format for the data subflows 2.1 to 2.6, a configuration block 18 is provided. The configuration block 18 specifies which process is transmitted to the device to be tested with which data rate and which modulation method. Since, in the case of the test method, the transport format has to be changed as a function of a mean CQI determined, the evaluating unit 17 is connected to the configuration block 18. Depending on the mean CQI determined in the evaluating unit 17, the configuration block 18 allocates to at least two processes a suitably altered transport format that corresponds to the particular lower CQI or to the particular higher CQI.

The invention is not limited to the exemplary embodiment shown. In particular, any desired features of the exemplary embodiment can be combined with one another in any desired way.

The invention claimed is:

1. A method of determining an error rate in a data transfer in a mobile radio system having at least one transfer channel in which a plurality of data subflows is transmitted, comprising the following method steps:

generating the plurality of data subflows by a signal generator unit, specifying transport formats individually for each data subflow, transmitting the data subflows in a number of associated transfer blocks in each case to a device to be tested by a testing device, receiving and evaluating the transfer blocks by the device to be tested and sending back a positive or negative confirmation signal for every transfer block, determining an individual error rate for every one of the plurality of data subflows from the received confirmation signals of transfer blocks associated with all the data subflows by the testing device, wherein the method comprises the testing device individually specifying for every data subflow a sequence of redundancy versions for the transfer blocks to be repeatedly transferred, and the testing device individually specifying the redundancy version sequence for a data subflow independently of positive or negative confirmation signals sent back to the transfer blocks of said data subflow.

2. Method according to claim 1, comprising using different modulation methods for transmitting different data subflows.

3. Method according to claim 1, comprising the testing device individually specifying for every data subflow a maximum number of transfer repetitions of those transfer blocks for whose first transmission a negative confirmation signal is sent back.

4. Method according to claim 3, comprising specifying the maximum number of transfer repetitions for a data subflow in each case independently of positive or negative confirmation signals sent back to the transfer blocks of said data subflow.

5. Method according to claim 1, comprising the testing device adding a mismatching CRC checksum to the data transmitted in a transfer block to enforce at least one negative confirmation signal.

6. Method according to claim 1, comprising the testing device simultaneously determining the block and bit error rates on a reference measuring channel.

7. Testing device for determining an error rate during the transfer of data in a mobile radio system, wherein the testing device comprises:

a signal generator unit configured to generate a plurality of data subflows, a configuration block configured to specify transport formats individually for every data subflow, a transceiver configured to transmit the data subflows in a number of associated transfer blocks in each case and for receiving a positive or negative confirmation signal, and an evaluating unit configured to determine an error rate for every one of the plurality of data subflows from the received confirmation signals of transfer blocks associated with all the data subflows, wherein the configuration block is further configured to specify a redundancy version for transfer blocks to be repeatedly transmitted in the data subflows, and configured to individually specify for every data subflow a sequence of redundancy versions for the transfer blocks to be repeatedly transferred, wherein the configuration block is configured to specify the redundancy version sequence of a data subflow in each case independently of positive or negative confirmation signals sent back to the transfer blocks of said data subflow.

8. Testing device according to claim 7, wherein the evaluating unit comprises a plurality of evaluating blocks configured to determine an error rate for one data subflow in each case.

9. Testing device according to claim 7, wherein the signal generator unit comprises a plurality of signal generators configured to generate transmission signals for data subflows with identical or different transport formats for the individual data subflows.

10. Testing device according to claim 7, wherein the configuration block can specify a maximum number of transfer repetitions of individual transfer blocks of a data subflow after a negative confirmation signal.

11. Testing device according to claim 7, wherein the configuration block can specify the maximum number for a data subflow in each case independently of positive or negative confirmation signals sent back to the transfer blocks of said data subflow.

12. Testing device according to claim 7, wherein a block and bit error rate can be determined by the transfer and the reception of a reference measuring channel.

* * * * *